United States Patent [19]
Vinciguerra

[11] Patent Number: 5,860,218
[45] Date of Patent: Jan. 19, 1999

[54] SYNCHRONIZED RECIPROCATING SAW MECHANISM

[76] Inventor: Joseph Vinciguerra, 64 Ervin Rd., Pipersville, Pa. 18947

[21] Appl. No.: 734,136

[22] Filed: Oct. 21, 1996

[51] Int. Cl.[6] .............................. B23D 49/10; B26D 5/08; B27B 19/00
[52] U.S. Cl. ................................ 30/392; 30/500; 30/503; 83/618; 83/751
[58] Field of Search ............................. 30/392, 500, 503; 83/618, 620, 628, 647, 746, 751

[56] References Cited

U.S. PATENT DOCUMENTS 3,503,294  3/1970  Vinciguerra et al. ...................... 83/618
4,969,270  11/1990  Berghauser et al. .................. 30/392 X

*Primary Examiner*—Eugenia Jones
*Attorney, Agent, or Firm*—Joseph W. Molasky & Associates

[57] ABSTRACT

A synchronized reciprocating sawing device having at least one drive plate, saw retaining plates, and a plurality of blades which exhibit little or no vibration during the application of high torque and high revolutions. This device is comprised of one or more drive plates mounted between two mounting blocks which contain grooves that form a channel within which saw retaining plates are constrained to move as a reciprocating force is transmitted from at least one drive plate to saw retaining plates. The force is transmitted in a plane defined by the plane of each drive plate and the saw retaining plates to which each of said driving plates is operatively attached.

10 Claims, 7 Drawing Sheets

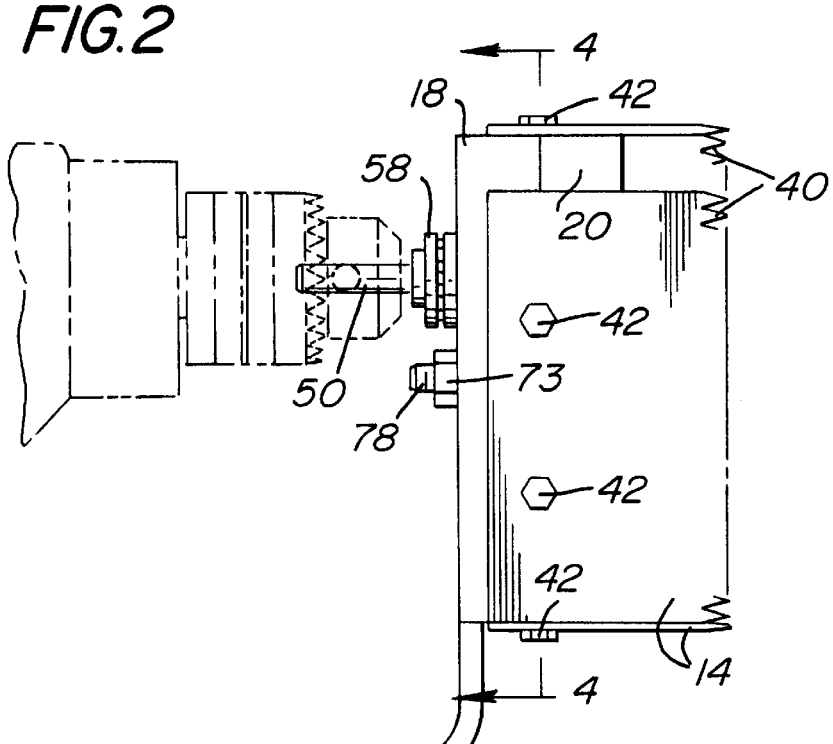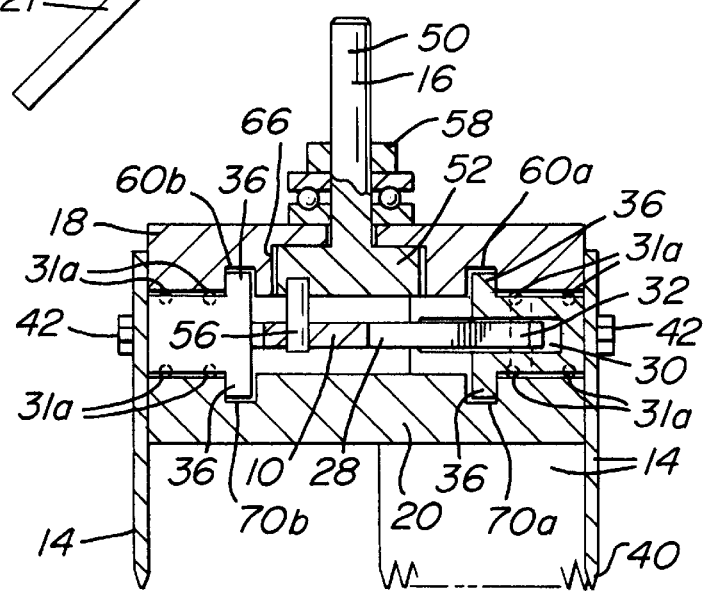

SYNCHRONIZED RECIPROCATING SAW MECHANISM

This invention relates to a device having multiple reciprocating and synchronized saw blades. More particularly, this invention relates to a sawing device which has the capability of producing polygonal or closed-curved openings in a flat surface.

BACKGROUND OF THE INVENTION

U.S. Pat. No. 3,503,294 of Joseph Vinciguerra and James A. Henigan discloses a sawing machine having several blades with serrated edges capable of producing closed figures cut from a flat surface as, for example, squares, rectangles, polygons such as pentagons, hexagons, and the like, and circles or ellipses. In this device, the drive plates may be star shaped.

Unfortunately, U.S. Pat. No. 3,503,294 has the following drawbacks:

1. transfer of rotary torque power from a rotating shaft assembly to a reciprocating driving plate is not uniform and often gives rise to severe vibrations when operated much in excess of 1200 revolutions per minute;
2. the driving plate may directly contact a wall's surface while such wall is being cut by reciprocating saw blades and become damaged;
3. there is a tendency, in some instances, for the driving plate or the saw retaining plates to twist and bind when certain torque levels are exceeded; thereby limiting the degree of useful torque that can be utilized;
4. any angled contact of the cutting edges with the surface which is to be cut usually results in a buckling of the drive plate and a binding of the cutting blades.

BRIEF DESCRIPTION OF THE DRAWINGS

FIG. 2 is a side elevational view of the device of FIG. 1 with a power source shown in phantom.

FIG. 6 is a sectional view taken along line 6—6 of FIG. 4.

SUMMARY OF THE INVENTION

Figure 1:
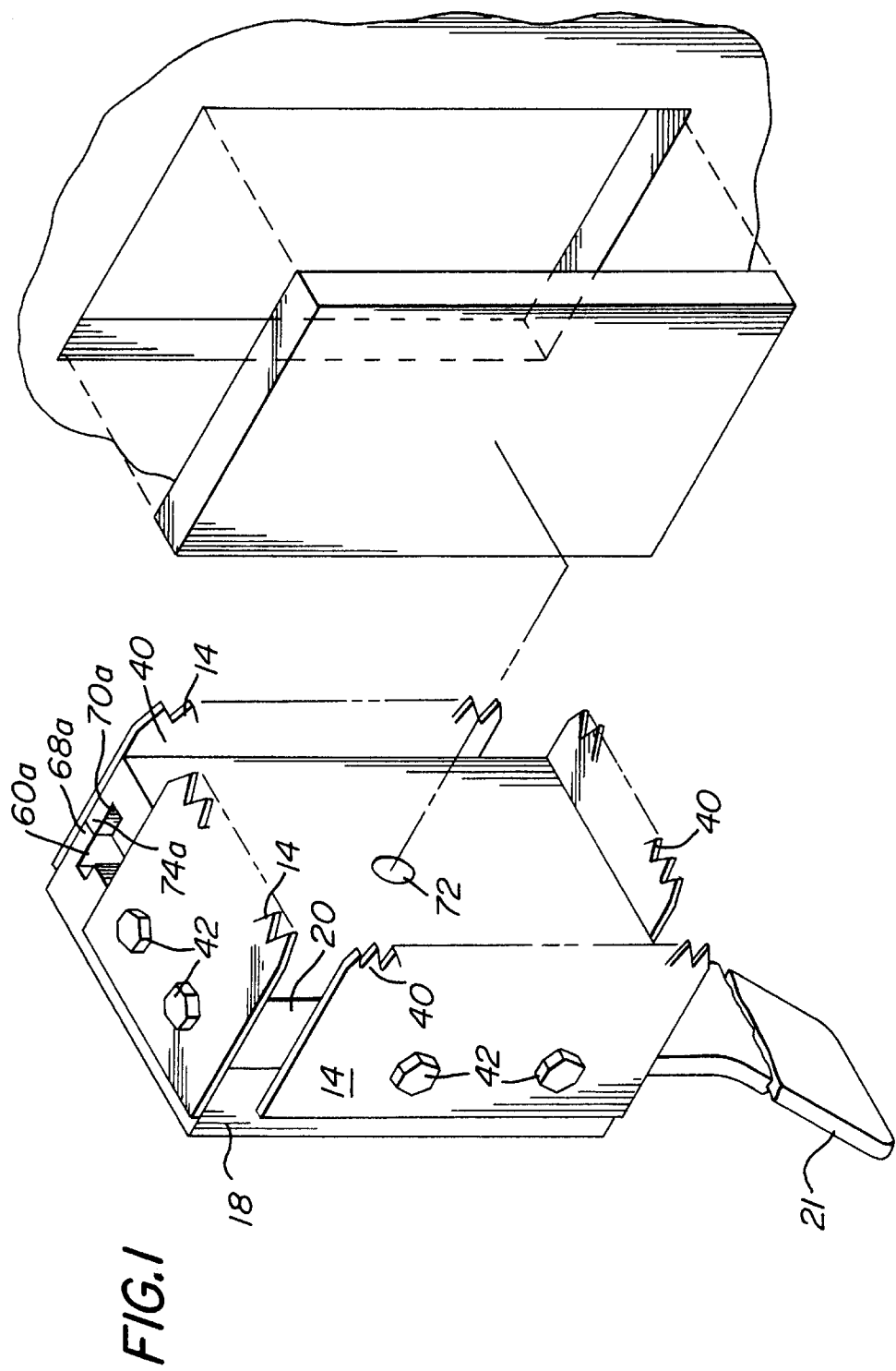
FIG. 1 is an isometric view of the device of this invention.

This invention avoids the limitations associated with U.S. Pat. No. 3,503,294.

It provides for a sawing device which efficiently converts rotary torque power from a rotating shaft to a reciprocating driving plate while simultaneously dampening or eliminating those vibrations which occur at revolutions of 1200 rpms or greater.

Moreover, the drive plate is protected because it is housed between two plates which serve as a shield against purposeful or inadvertent contact.

In addition, this device is eminently suitable for cutting into flat surfaces over a wide range of angles, including angles of 90° or more.

The improvements of this invention reside largely in transforming rotary power or torque into a reciprocating force between two connectable plates which, in combination, form a mounting block. The mounting block contains in one plate, hereinafter referred to as the first section, a hole for a shaft which may be engaged by the jaw of a drill and, at the opposite end, means for causing a first coupling to move in a circular path. One such coupling consists essentially of a pin which is mounted eccentrically with relation to the shaft and, as the shaft rotates, the pin travels a similar circuitous route. This pin, protected by a bushing, is disposed in a second coupling which converts the rotary motion of the pin into a reciprocating motion for the drive plate.

The drive plate may be unitary or it may be comprised of discrete members which, when joined, act in concert to drive the serrated blades.

In one embodiment, a single driving plate is rotatably mounted on a shaft disposed between the two sections of the mounting block, hereinafter referred to as the driving plate mount. As the first coupling rotates in a circle, the pin interacts with a second coupling, also joined to the driving plate, and this impels the driving plate to reciprocate about the driving plate mount. Typical of the second coupling is a groove or opening, preferably elliptical, within the driving plate.

When two driving plates are employed, no shaft is required. Both driving plates are disposed co-planar mode between the two sections of the mounting block in a side-by-side relationship and each contains a groove within which is disposed a coupling pin. As the pin moves in a circular path, an essentially horizontal groove within the driving plate impels the plate to move at right angles to the orientation of the groove, i.e., in an essentially up and down oscillating path. The remaining driving plate, having a groove substantially at right angles to the orientation of the first groove and disposed vertically, moves back and forth horizontally as the first coupling moves in a circular path.

The advantage to the two-part driving plate lies in its ability to provide a smooth and more efficient transfer of power from the rotating shaft to the oscillating driving plates because it has the potential for accepting a sustained force of high magnitude.

An alternative embodiment provides for a plurality of cutting means and a plurality of blade retaining means in a single unit. Preferably, the cutting means is removably joined to the blade retaining means since it facilitates blade replacement. Moreover, the blade retaining means maintains the cutting means in a rigid orientation so that they are constrained to move only in a proscribed path.

In summary, a torque transfer means which comprises a first torque means and a second torque means uses the circular motion of the former to induce a reciprocating movement in the latter. The first torque means is mounted eccentrically to a shaft to which can be applied a torque from a variety of power tool sources as, for example, a drill. The pin is disposed within an elliptical groove or opening so that, as the pin moves in a circular motion about the shaft to which it is eccentrically mounted, the elliptical opening will move in a reciprocating path. The elliptical opening here referred to as the second torque means may be disposed in a driving plate so that the driving plate oscillates with the elliptical opening.

The first section of the mounting block is equipped with an aperture for receiving a shaft which provides the rotary or torque power to the eccentrically mounted first torque means or pin. In the single plate embodiment, the shaft on which the driving plate is mounted is centrally located with respect to the two mounting block sections and joins the two sections. To assist in orienting one section of the mounting block to another, holes with orienting pins at the corners of the mounting block are employed.

The driving plate is star-shaped and possesses, at each extremity, a forked-like opening which interacts with a pin in the grooves of the blade retaining means to transfer the oscillating motion of the driving plate to the blade retaining means. The driving plates are constrained to move in linear paths by virtue of the grooves disposed within the mounting block. These grooves are so oriented as to be in alignment with grooves in the second portion of the mounting block, and they cooperatively cause the blade retaining means to move in a linear path between both portions of the mounting plate. Both the movement of the driving plate and the blade retaining means are coplanar in what is referred to hereinafter as the 'action plane ' of the device.

According to another embodiment of this invention, a two-part driving plate means is employed. In this embodiment, the reciprocating blades are in pairs with a maximum of four blades; however, more than four blades may also be used and, instead of a square or rectangle, as many as five or six-sided figures or more may be employed. In systems involving two or more driving plates, the rotatable shaft may be substituted by other drive means; however, in all systems, it is essential that the driving plates be disposed within blade retaining means.

As the blade retaining means are constrained to move in linear paths by matching and cooperating grooves in each portion of the mounting block after the mounting block parts are appropriately connected, so too the driving plates are oriented by the grooves or openings within the blade retaining means.

DETAILED DESCRIPTION OF PREFERRED EMBODIMENTS

Figure 3:
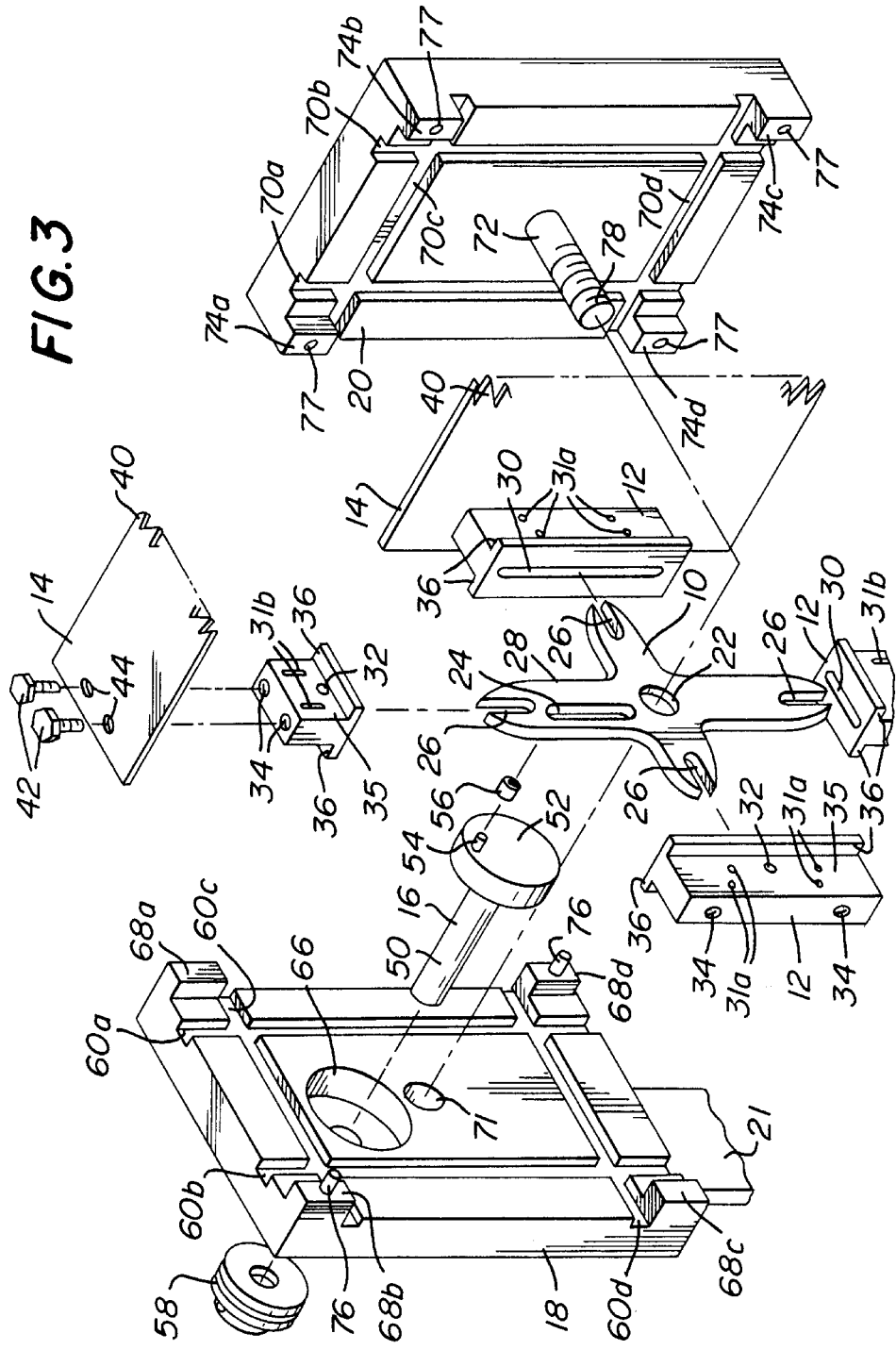
FIG. 3 is an exploded isometric view of the device shown in part in FIG. 4.

This invention is illustrated by FIG.3 which discloses driving plate 10, saw retaining plates 12, saw blades 14, shaft assembly 16, and a two-part mounting block consisting of a first section 18 and a second section 20. Driving plate 10 includes an aperture. 22, an elongated opening 24, and radial rocker arms 28, the ends of which are forked to form couplings or connectors 26. Each saw retaining plate 12 contains an elongated opening 30, pin coupling 32, threaded holes 34, and flanges 36. Saw blade 14 is characterized by a single row of serrated teeth 40, threaded bolts 42, unthreaded holes 44, a first end 46 and a second end 48. Shaft assembly 16 includes a shaft 50, drive wheel 52, pin coupling 54, bushing 56, and a bearing means 58 adapted to support shaft assembly 16 along with a power source (not shown) for torque.

Figure 8:
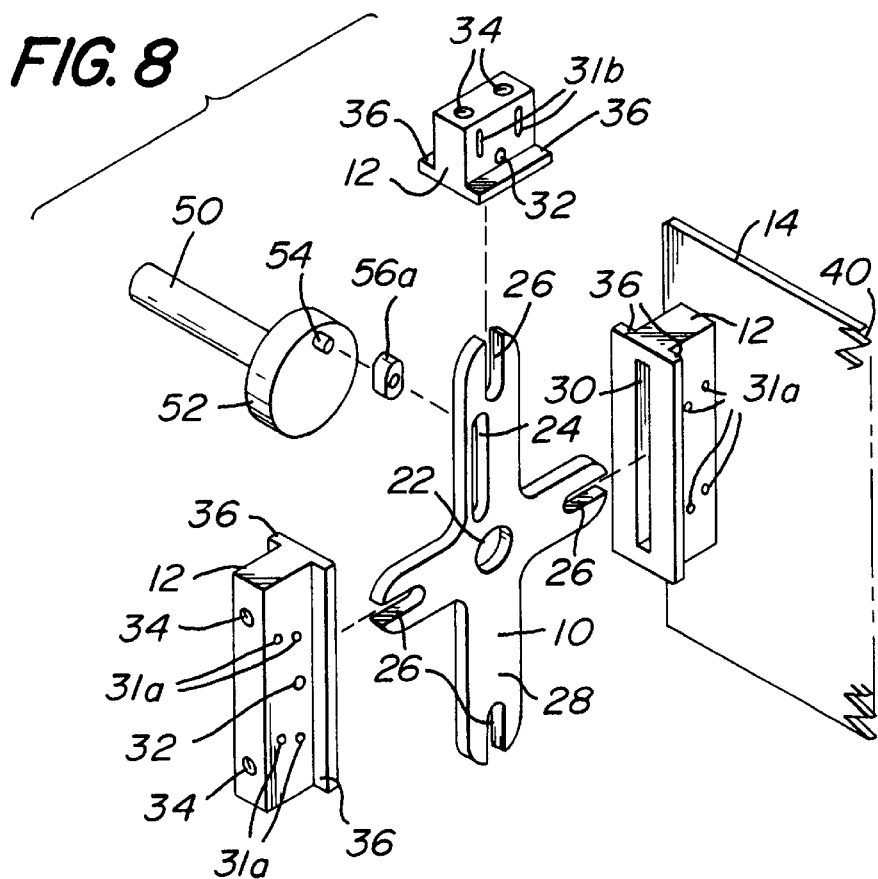
FIG. 8 is a partial exploded isometric view of the embodiment shown in part in FIG. 7.

FIG. 8 shows an alternate form of torque transfer means. In this embodiment, shaft 50 moves through a first torque path by virtue of the mating of pin 54 and bushing 56a, and this gives rise to a reciprocating motion in driving plate 10.

In this embodiment, the bushing 56a is characterized by an elliptical configuration; which is in contrast to the cylindrically shaped bushing 56 shown in FIG. 3. Flat surfaces 35, upon which blade retaining plates 12 slide, preferably, contain one of two types of bearing: a partially sunk spherical bearing 31a or a partially sunk cylindrical bearing 31b.

Figure 12:
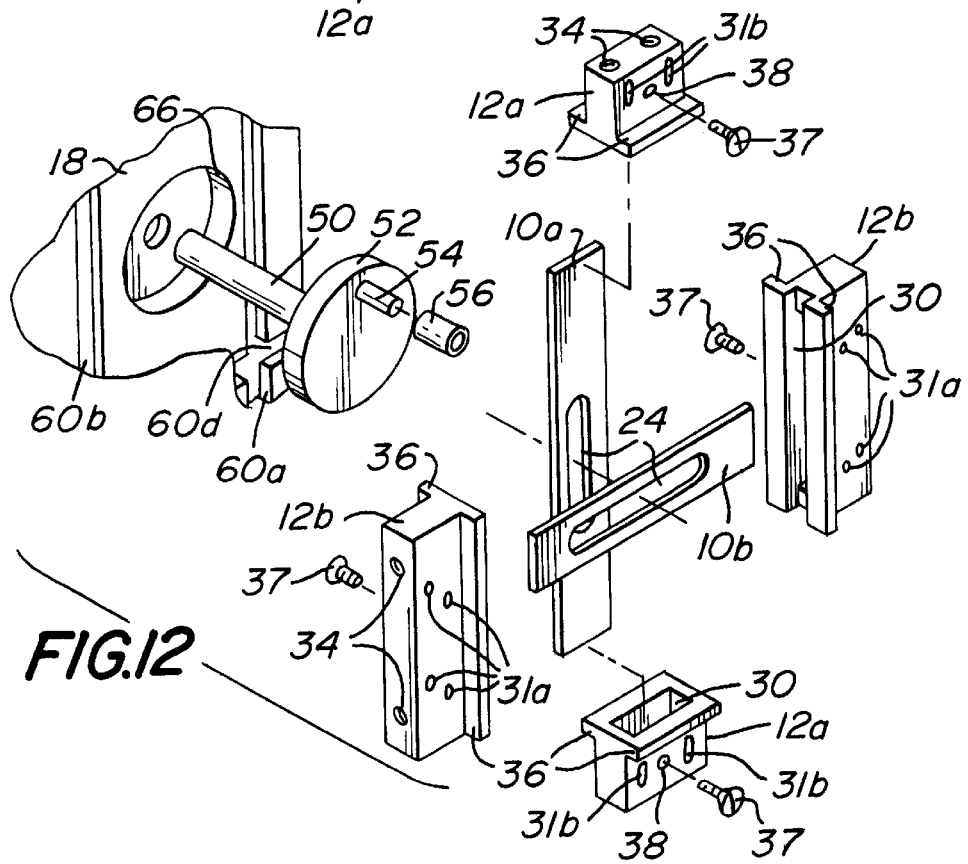
FIG. 12 is a partial exploded isometric view of the embodiment shown in FIG. 9.

FIG. 12 shows an alternate form of power transfer through driving plates 10a and 10b. These plates transfer torque from shaft 50 to reciprocating blades 14 (not shown in FIG. 12). The circular motion of pin 54 and bushing 56 cause plate 10a to move from side to side as plate 10b moves up and down or vertically. The transfer of linear force is achieved by coupling the ends of driving plate 10a, to blade retaining plates 12a and driving plate 10b to retaining plates 12b as, for example, by threaded screws 37 which engage threaded holes 38 in blade retaining plates 12a or 12b. Screws 37 correspond to pin couplings 32 of FIG. 3 and serve essentially the same function, except that the coupling between blade retaining plates 12a or 12b and driving plate 10a or 10b is, in this instance, more secure.

Figure 5:
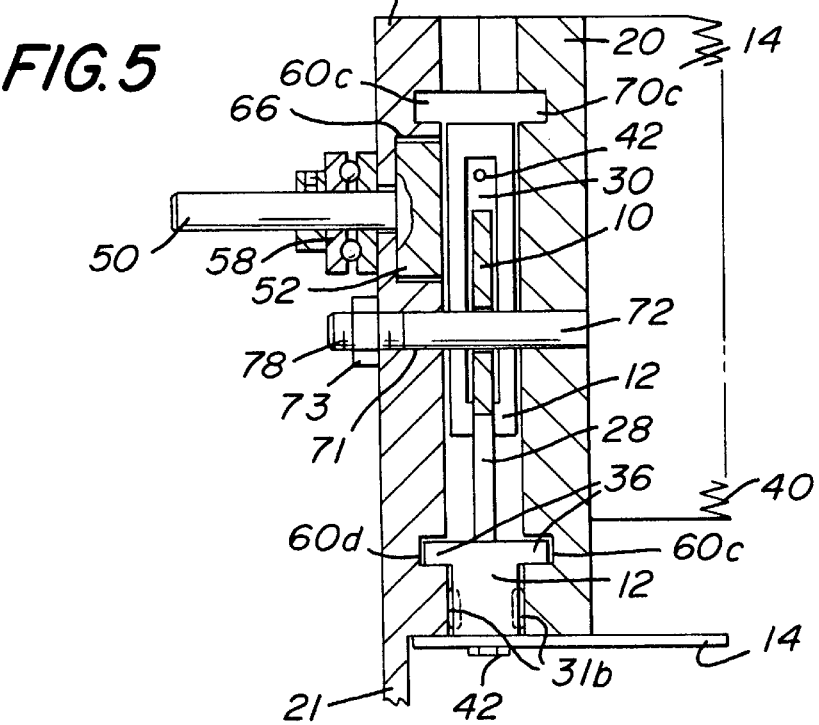
FIG. 5 is a sectional view taken along line 5—5 of FIG. 4.

In FIG. 3, the first section 18 of the mounting block includes retaining grooves 60a, 60b, 60c, and 60d (for engaging flanges 36 of saw retaining plates 12), recessed opening 66 and corner weight bearing posts 68a, 68b, 68c, and 68d, and orientation pins 76. The second section 20 of the mounting block contains retaining grooves 70a, 70b, 70 c, and 70d for engaging flanges 36 of saw retaining plates 12, and orientation holes 77. Driving plate mount 72 has a threaded end 78 which passes through aperture 71 to engage a threaded nut 73 (shown in FIGS. 2 and 5) or, alternatively, the aperture 71 in first section 18 may, itself, be threaded for engagement with nut 73. Corner weight bearing posts 74a, 74b, 74c, and 74d of second section 20 mate, respectively, with corner weight bearing posts 68a, 68b, 68c, and 68d of first section 18 and orientation pins 76 enter orientation holes 77.

Figure 4:
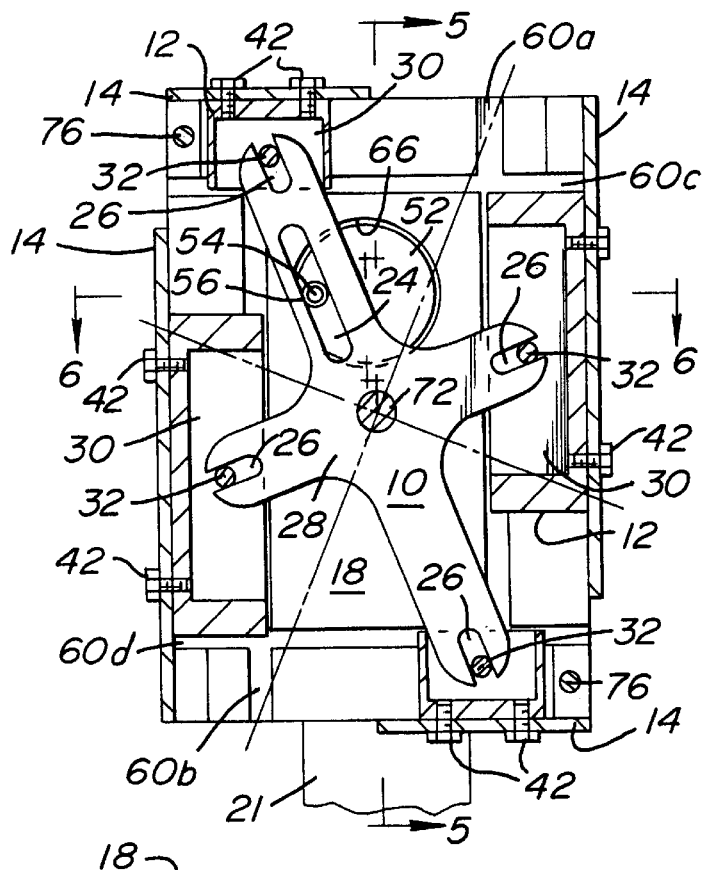
FIG. 4 is a sectional view taken along line 4—4 of FIG. 2.

FIGS. 3, 4, 5, and 6 illustrate the operation of the device of this invention. As shaft 50 of shaft assembly 16 rotates, eccentric pin coupling 54 and rotary bushing 56 move within elongated opening 24 of driving plate 10. As the rotary bushing 56 moves in a circular path, the motion of driving plate 10, as can be seen with reference to FIGS. 4 and 5, oscillates from left to right. As driving plate 10 oscillates, the first reciprocating transfer means, that is, the elongated or forked couplings 26, disposed within elongated openings 30 of saw retaining plates 12 (FIGS. 3 and 4) act upon the second reciprocating transfer means, that is, pins 32 disposed within elongated openings 30. The force applied via forked couplings 26 to pins 32 actuates the saw retaining plates 12 and impels them to move simultaneously within retaining grooves 60a–60d and 70a–70d due to the movement of the flanges 36 along the path determined by retaining groove pairs 60a and 70a; 60b and 70b; 60c and 70c; and 60d and 70d. As shown in FIG. 4, maximum movement of saw retaining plate 12 is just short of corner weight bearing posts 68a–68d and corresponding and mating corner weight bearing posts 74a–74d. Saw blades 14 (attached to saw retaining plates 12) extend beyond corner weight bearing posts 68a–68d and 74a–74d, respectively, to complete a closed path along which they are impelled to move.

The improvement of this invention is due largely to the elongated or forked couplings 26 which afford an oscillating or reciprocating force within an action plane that is oriented by elongated openings 30 between grooves corresponding to grooves 60a–60d and 70a–70d. This is in contrast to U.S. Pat. No. 3,503,294, where side slots in the driving plate engage pins and afford an essentially linear force. Moreover, the driving plate is orientationally constrained to a plane, the action plane, defined by the plurality of elongated openings 30 contained within saw retaining plates 12 and driving plate mount 72. This ensures that regardless of the amount of torque or revolutions per minute imposed on driving plate 10, it remains within the action plane and resists easily any tendency to warp or distort. Also, the mounting block of this invention encompasses the driving plate 10, and thus accords it a measure of protection which is not possible with the device covered by U.S. Pat. No. 3,503,294.

Handle 21 provides leverage and permits a user to orient the device is such manner as to engage a surface either at an angle or perpendicular thereto. FIG. 1 shows a typical dead-on perpendicular entry.

Figure 7:
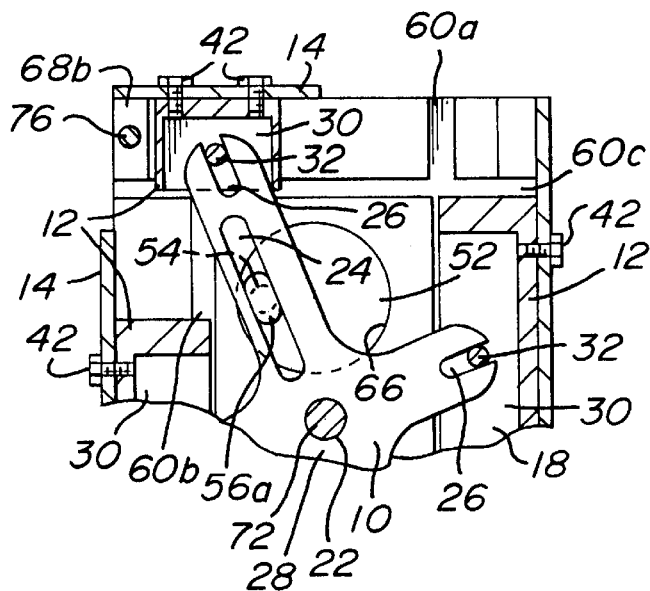
FIG. 7 is a partial sectional view of a modified version of the embodiment shown in FIG. 2.

FIGS. 7 and 8, illustrate an alternative embodiment of this invention. Numbers for elements in all embodiments that serve the same operating functions in both embodiments bear the same number. An "a" appears where the element in FIG. 8 differs from a corresponding element in FIG. 3.

Figure 9:
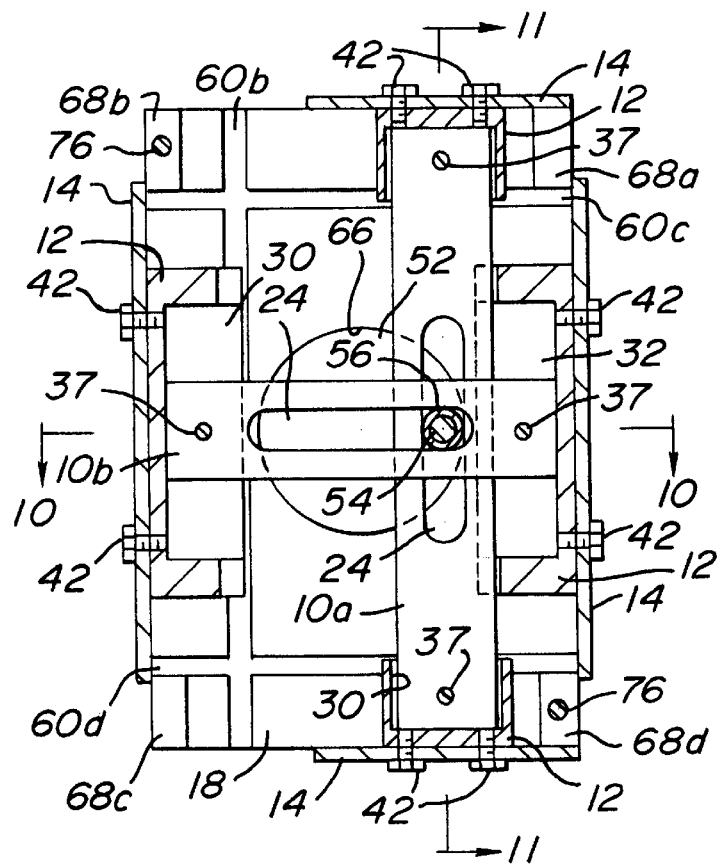
FIG. 9 is a sectional view similar to FIG. 4 of an alternative embodiment.
Figure 10:
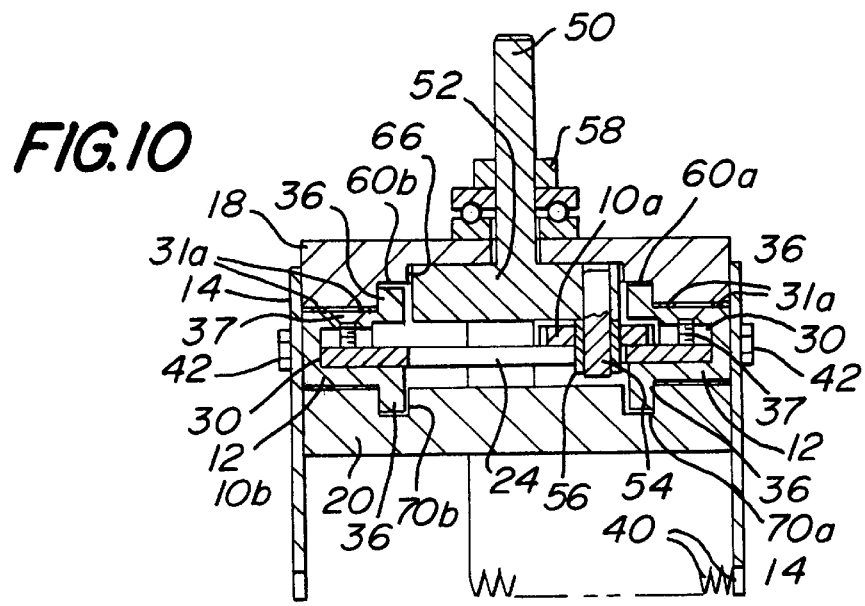
FIG. 10 is a sectional view taken along line 10—10 of FIG. 9.
Figure 11:
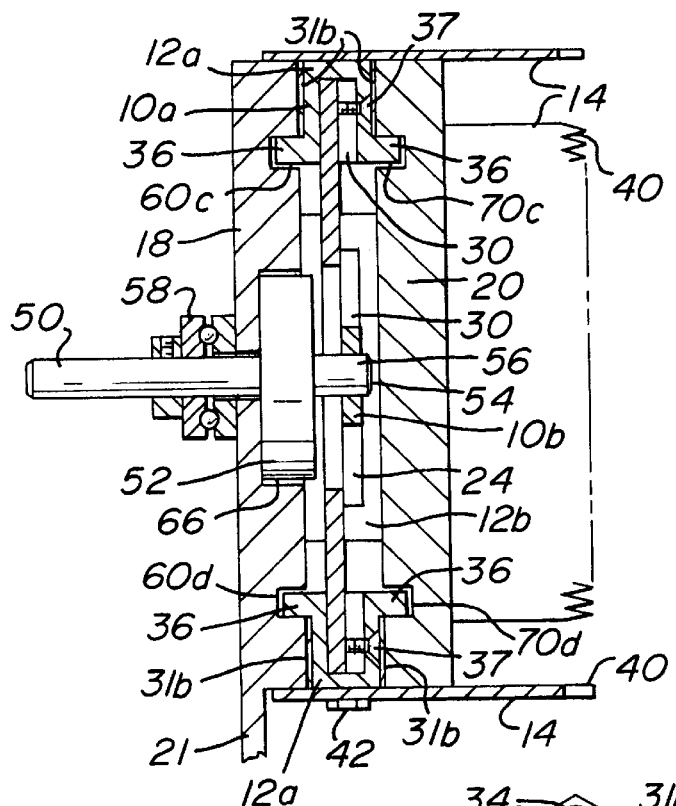
FIG. 11 is a sectional view taken along line 11—11 of FIG. 9.

It is to be noted that there is no driving plate mount 72 in the alternate embodiment of FIG. 12. Orientation of driving plates 10a and 10b are determined by the orientation of the elongated slots 30 within blade retaining plates 12a and 12b, respectively. As shaft 50 rotates under the influence of an applied torque, pin 54 and the engaged bushing 56 follows a circular path in a plane whose orientation is determined by the orientation of shaft 50, pin 54, and bushing 56. As shown in FIGS. 9, 10, and 11, pin 54 and bushing 56 extend through driving plates 10a and 10b so that, as shaft 50 rotates, driving plates 10a and 10b are induced to move in a horizontal or vertical oscillation, respectively. Consequently, blades 14 (joined to blade retaining means 12a) move simultaneously in horizontally fashion as shaft 50 rotates. At the same time, blades 14 (joined to blade retaining means 12b) are impelled vertically as shown in FIGS. 9 and 12.

First section 18 and second section 20 of the mounting block in FIGS. 8 and 9 are joined by bolts which threadedly engage apertures in corner weight bearing posts 74a–d.

FIGS. 3 through 5 and FIGS. 9 through 12 also show improved means for facilitating the movement of the retaining plates 12 within grooves 60a–60d and 70a–70d. These include spherical bearings 31a or cylindrical bearings 31b the composition of which may be oiled brass for blade retaining means 12 and a refractory material for the mounting block comprising sections 18 and 20.

While the preferred embodiments have been fully described and depicted for the purposes of explaining the principles of the present invention, it will be appreciated by those skilled in the art that modifications and changes may be made thereto without departing from the spirit and scope of the invention set forth in the appended claims. Specific methods, or embodiments discussed in this Specification are intended to be only illustrative of the claimed invention.

References to documents made in this Specification are expressly incorporated herein by reference in their entirety.

What is claimed is:

1. A sawing mechanism comprising:
   (a) a plurality of saw blades, each saw blade having a serrated edge and the plurality of saw blades disposed for substantially simultaneous engagement with a surface of an object to be sawed;
   (b) a plurality of saw retaining plates, each saw retaining plate attached to a separate one of said plurality of saw blades and comprising an elongated opening and a pair of flanges, said pair of flanges disposed parallel to the serrated edge of said attached saw blade;
   (c) a driving plate formed to comprise a plurality of coplanar arms, each arm disposed in a separate one of the plurality of elongated openings of said plurality of saw retaining plates, said driving plate further comprising a centrally disposed circular aperture and an off-center elongated aperture;
   (d) a drive shaft assembly including means for engaging the off-center elongated aperture of said driving plate, said drive shaft assembly for providing circular rotation that is translated by said off-center elongated aperture into reciprocating motion of said driving plate arms, thereby producing reciprocating motion of said attached plurality of saw blades;
   (e) a first mounting block including an aperture for accepting said drive shaft assembly such that a rotational power source may be coupled to said drive shaft assembly, said first mounting block further comprising a plurality of retaining grooves for mating with a first flange of said pair of flanges of each saw retaining plate so as to allow for movement of said plurality of saw retaining plates only within said retaining grooves; and
   (f) a second mounting block including a driving plate mount, said driving plate mount disposed through the centrally disposed circular aperture of said driving plate and thereafter attached to said first mounting block such that said driving plate is disposed between said first and second mounting blocks, said second mounting block further comprising a plurality of retaining grooves for mating with the remaining flange of said pair of flanges of each saw retaining plate so as to allow for movement of said plurality of saw retaining plates only within said retaining grooves.

2. A sawing mechanism as defined in claim 1, wherein the drive shaft assembly comprises
   a drive shaft including first and second end terminations, the first end termination disposed through the first mounting block aperture;
   a drive wheel defined by opposing first and second surfaces, said first surface attached to the second end termination of said drive shaft;
   a drive pin attached at an eccentric location to said second surface of said drive wheel and disposed to protrude therefrom; and
   a bushing disposed to cover said drive pin, said bushing for engaging the elongated aperture of the driving plate.

3. A sawing mechanism as defined in claim 2 wherein the bushing is circular in cross section.

4. A sawing mechanism as defined in claim 2 wherein the bushing is elliptical in cross section.

5. A sawing mechanism as defined in claim 1 wherein
   the driving plate arms are forked to form a two-prong end portion; and
   the saw retaining plates are formed to include a pin disposed within the elongated opening such that the two-prong end portion of each arm engages an associated saw retaining plate pin.

6. A sawing mechanism as defined in claim 1 wherein each saw retaining plate further comprises at least one bearing for facilitating the motion of the associated driving plate arm within the saw retaining plate elongated opening.

7. A sawing mechanism as defined in claim 1 wherein the second mounting block driving plate mount includes a threaded end portion to facilitate attachment of said second mounting block to said first mounting block.

8. A sawing mechanism as defined in claim 1 wherein the first and second mounting blocks further comprise orientation means for fixing said first mounting block to said second mounting block in a predetermined relationship.

9. A sawing mechanism as defined in claim 8 wherein the first mounting block orientation means comprises a plurality of orientation pins and the second mounting block orientation means comprises a plurality of orientation holes for mating with said plurality of orientation pins and fixing said first mounting block to said second mounting block in the predetermined relationship.

10. A sawing mechanism as defined in claim 1 wherein each saw retaining plate includes at least one threaded opening and each saw blade includes at least one cooperating opening, the sawing mechanism further comprising a plurality of screws for attaching each saw blade to its associated saw retaining plate.

\* \* \* \* \*